(12) United States Patent
Ito et al.

(10) Patent No.: US 12,392,281 B2
(45) Date of Patent: Aug. 19, 2025

(54) COMBUSTION DEVICE AND GAS TURBINE SYSTEM FOR SUPPRESSING VAPORIZATION OF AMMONIA

(71) Applicant: IHI Corporation, Tokyo (JP)

(72) Inventors: Shintaro Ito, Tokyo (JP); Masahiro Uchida, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/462,910

(22) Filed: Sep. 7, 2023

(65) Prior Publication Data
US 2024/0035415 A1    Feb. 1, 2024

Related U.S. Application Data

(63) Continuation of application No. PCT/JP2022/009178, filed on Mar. 3, 2022.

(30) Foreign Application Priority Data

Mar. 26, 2021    (JP) .................................. 2021-054176

(51) Int. Cl.
F23R 3/28    (2006.01)
F02C 3/30    (2006.01)
F23R 3/10    (2006.01)
F23R 3/36    (2006.01)

(52) U.S. Cl.
CPC .................. *F02C 3/30* (2013.01); *F23R 3/10* (2013.01); *F23R 3/28* (2013.01); *F23R 3/36* (2013.01)

(58) Field of Classification Search
CPC .. F23R 3/045; F23R 3/28; F23R 3/283; F23R 3/36
See application file for complete search history.

(56) References Cited

U.S. PATENT DOCUMENTS

| | | | |
|---|---|---|---|
| 3,978,662 A | 9/1976 | DuBell et al. | |
| 2004/0035114 A1* | 2/2004 | Hayashi | F23R 3/18 60/737 |
| 2006/0266046 A1 | 11/2006 | Bonzani et al. | |
| 2011/0100018 A1* | 5/2011 | Nakamura | F23N 1/002 60/776 |
| 2014/0332603 A1 | 11/2014 | Cramb et al. | |
| 2015/0377488 A1 | 12/2015 | Elkady et al. | |
| 2017/0321609 A1 | 11/2017 | Ogata et al. | |
| 2021/0079847 A1 | 3/2021 | Kawakami et al. | |

FOREIGN PATENT DOCUMENTS

| | | |
|---|---|---|
| CN | 105318357 A | 2/2016 |
| EP | 3517757 A1 | 7/2019 |
| JP | 06-066156 A | 3/1994 |
| JP | H06-055049 U | 7/1994 |
| JP | H11-270356 A | 10/1999 |
| JP | 2010-019195 A | 1/2010 |
| JP | 2016-090141 A | 5/2016 |
| JP | 2016-191507 A | 11/2016 |

* cited by examiner

Primary Examiner — Scott J Walthour
(74) Attorney, Agent, or Firm — Rothwell, Figg, Ernst & Manbeck, P.C.

(57) ABSTRACT

A combustion device includes: a liner including an opening at an end, the liner inside of which is formed with a combustion chamber; an air flow path communicating with the opening of the liner; an ammonia supply pipe inserted through the opening of the liner; and a starting fuel supply pipe disposed between the ammonia supply pipe and the air flow path.

14 Claims, 4 Drawing Sheets

COMBUSTION DEVICE AND GAS TURBINE SYSTEM FOR SUPPRESSING VAPORIZATION OF AMMONIA

CROSS REFERENCE TO RELATED APPLICATIONS

This application is a continuation application of International Application No. PCT/JP2022/009178, filed on Mar. 3, 2022, which claims priority to Japanese Patent Application No. 2021-054176, filed on Mar. 26, 2021, the entire contents of which are incorporated by reference herein.

BACKGROUND ART

Technical Field

The present disclosure relates to a combustion device and a gas turbine system. The present application claims the benefit of priority based on Japanese Patent Application No. 2021-054176 filed on Mar. 26, 2021, the content of which is incorporated herein.

Related Art

Gas turbine systems, with which power is obtained by combusting fuel in a combustor, are used. Some of the gas turbine systems use, for example, ammonia as fuel as disclosed in Patent Literature 1. By using ammonia as fuel, carbon dioxide emission is suppressed.

CITATION LIST

Patent Literature

Patent Literature 1: JP 2016-191507 A

SUMMARY

Technical Problem

Some of the gas turbine systems provide ammonia to a combustion chamber of a combustor after vaporizing ammonia by a vaporizer. Using a vaporizer contributes to an increase in the equipment cost and starting time in the gas turbine system. It is conceivable to supply liquid ammonia to a combustion chamber without using a vaporizer. In this case, liquid ammonia is sent to the combustion chamber through an ammonia supply pipe. There is a possibility that the ammonia supply pipe is heated by the high-temperature air supplied to the combustion chamber and that vaporization of ammonia occurs. When ammonia is vaporized in the ammonia supply pipe, an injection amount of ammonia becomes unstable.

An object of the present disclosure is to provide a combustion device and a gas turbine system capable of suppressing vaporization of liquid ammonia used as fuel.

Solution to Problem

In order to solve the above problems, a combustion device according to the present disclosure includes: a liner including an opening at an end, the liner inside of which is formed with a combustion chamber; an air flow path communicating with the opening of the liner; an ammonia supply pipe inserted through the opening of the liner; and a starting fuel supply pipe disposed between the ammonia supply pipe and the air flow path.

A heat shielding pipe disposed between the starting fuel supply pipe and the air flow path may be included.

The ammonia supply pipe may have a double pipe structure including an inner pipe and an outer pipe, the air flow path may include a first air flow path disposed on a radially inner side with respect to the inner pipe and a second air flow path disposed on a radially outer side with respect to the outer pipe, and the starting fuel supply pipe may include a first starting fuel supply pipe disposed between the inner pipe and the first air flow path and a second starting fuel supply pipe disposed between the outer pipe and the second air flow path.

A first heat shielding pipe disposed between the first starting fuel supply pipe and the first air flow path and a second heat shielding pipe disposed between the second starting fuel supply pipe and the second air flow path may be included.

In order to solve the above disadvantage, a gas turbine system of the present disclosure includes the combustion device described above.

Effects of Disclosure

According to the present disclosure, it is possible to suppress vaporization of liquid ammonia used as fuel.

DESCRIPTION OF EMBODIMENTS

Embodiments of the present disclosure will be described below by referring to the accompanying drawings. Dimensions, materials, other specific numerical values, and the like illustrated in the embodiments are merely an example for facilitating understanding, and the present disclosure is not limited thereto unless otherwise specified. Note that, in the present specification and the drawings, components having substantially the same function and structure are denoted by the same symbol, and redundant explanations are omitted. Illustration of components not directly related to the present disclosure is omitted.

Figure 1:
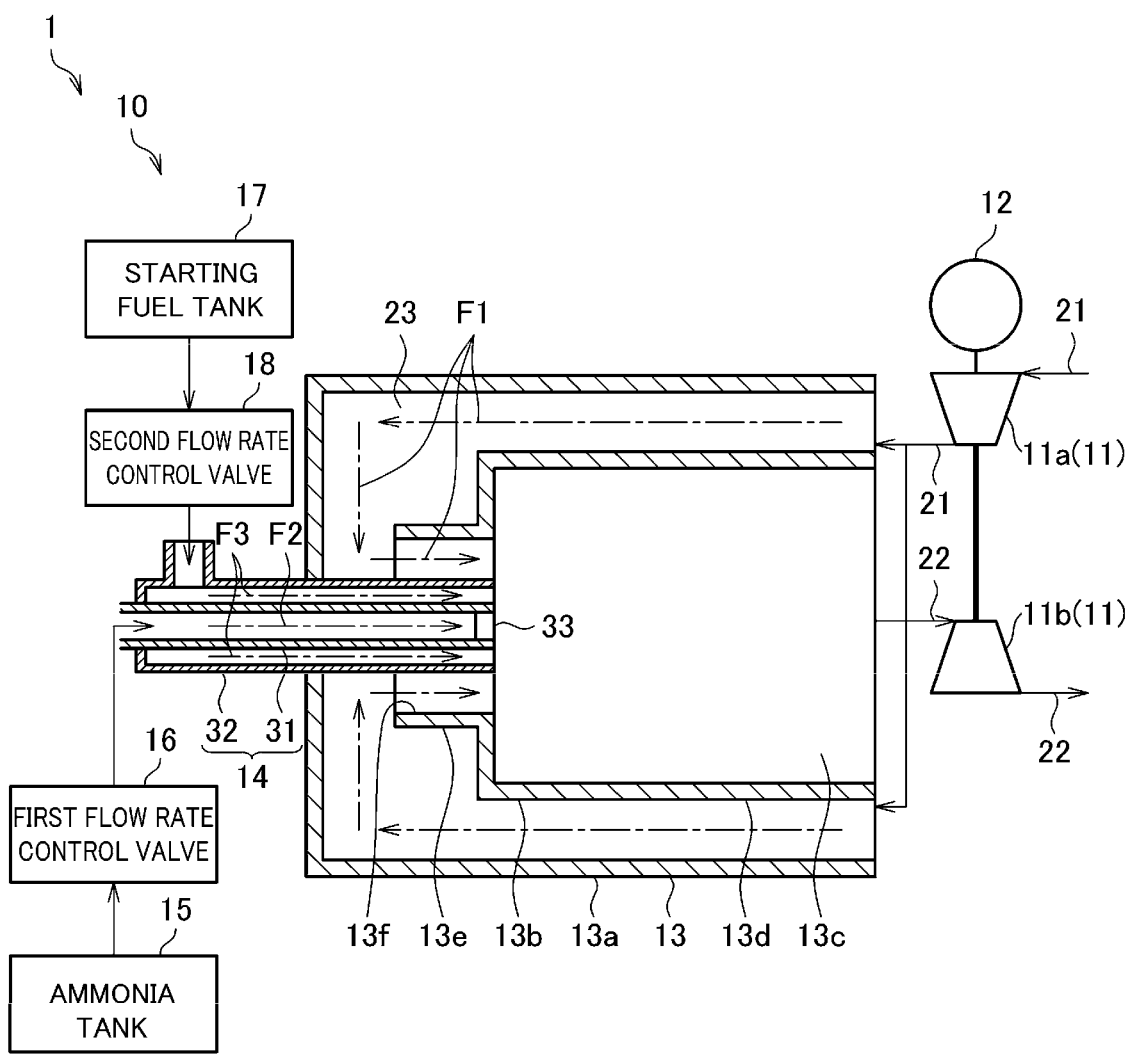
FIG. 1 is a schematic diagram illustrating a configuration of a gas turbine system according to an embodiment of the present disclosure.

FIG. 1 is a schematic diagram illustrating a configuration of a gas turbine system 1 according to the present embodiment. As illustrated in FIG. 1, the gas turbine system 1 includes a turbocharger 11, a generator 12, a combustor 13, a burner 14, an ammonia tank 15, a first flow rate control valve 16, a starting fuel tank 17, and a second flow rate control valve 18.

In the gas turbine system 1, the combustor 13, the burner 14, the ammonia tank 15, the first flow rate control valve 16, the starting fuel tank 17, and the second flow rate control valve 18 are included in a combustion device 10.

The turbocharger 11 includes a compressor 11a and a turbine 11b. The compressor 11a and the turbine 11b rotate in an integrated manner. The compressor 11a and the turbine 11b are connected by a shaft.

The compressor 11a is provided in an intake flow path 21 connected with the combustor 13. The air supplied to the combustor 13 flows through the intake flow path 21. An intake port (not illustrated) through which the air is taken in from the outside is provided at an upstream end of the intake flow path 21. The air taken in from the intake port passes through the compressor 11a and is sent to the combustor 13. The compressor 11a compresses the air and discharges the air to the downstream side.

The turbine 11b is provided in an exhaust flow path 22 connected with the combustor 13. Exhaust gas discharged from the combustor 13 flows through the exhaust flow path 22. An exhaust port (not illustrated) through which the exhaust gas is discharged to the outside is provided at a downstream end of the exhaust flow path 22. The exhaust gas discharged from the combustor 13 passes through the turbine 11b and is sent to the exhaust port. The turbine 11b generates rotational power by being turned by the exhaust gas.

The generator 12 is connected with the turbocharger 11. The generator 12 generates electric power using the rotational power generated by the turbocharger 11.

The combustor 13 includes a casing 13a, a liner 13b, and a combustion chamber 13c. The casing 13a has a substantially cylindrical shape. The liner 13b is included inside the casing 13a. The liner 13b has a substantially cylindrical shape. The liner 13b is disposed coaxially with the casing 13a. The combustion chamber 13c is formed inside the liner 13b. That is, the internal space of the liner 13b corresponds to the combustion chamber 13c. The combustion chamber 13c is a substantially cylindrical space. The exhaust flow path 22 is connected to the combustion chamber 13c.

As described later, fuel and air are supplied to the combustion chamber 13c. In the combustion chamber 13c, ammonia is mainly used as fuel, whereby combustion is performed. Note that, as described later, a starting fuel (such as natural gas or hydrogen) is also used as the fuel supplied to the combustion chamber 13c in addition to ammonia. The starting fuel is a fuel used for starting the gas turbine system 1. The exhaust gas generated by the combustion in the combustion chamber 13c is discharged to the exhaust flow path 22.

The liner 13b has a main body 13d. The main body 13d has a cylindrical shape. The combustion chamber 13c is formed inside the main body 13d. A communication portion 13e is provided at an end of the main body 13d. The communication portion 13e communicates the outside of the liner 13b (specifically, an air flow path 23 described later) with the combustion chamber 13c. The communication portion 13e has a cylindrical shape and is disposed coaxially with the main body 13d. The outer diameter of the communication portion 13e is smaller than the outer diameter of the main body 13d. The inner diameter of the communication portion 13e is smaller than the inner diameter of the main body 13d. Note that the inner diameter of the communication portion 13e may decrease as it is closer to the main body 13d. Various members such as swirling blades for forming a swirl flow of air may be provided in the communication portion 13e. An opening 13f is included at an end of the communication portion 13e on the side opposite to the main body 13d side. In this manner, the opening 13f is included at the end of the liner 13b.

The air flow path 23 is formed between the inner surface of the casing 13a and the outer surface of the liner 13b. An intake flow path 21 is connected to the air flow path 23. Air is sent from a compressor 11a to the air flow path 23 via the intake flow path 21. The air flow path 23 communicates with the opening 13f of the liner 13b. The burner 14 is inserted through the opening 13f of the liner 13b. As indicated by arrows F1, the air sent to the air flow path 23 passes through the air flow path 23 and then is injected into the combustion chamber 13c through the opening 13f of the liner 13b. Specifically, the air sent to the air flow path 23 passes between the inner curved surface of the communication portion 13e and the outer curved surface of the burner 14 (specifically, the outer curved surface of a starting fuel supply pipe 32 described later) and is injected into the combustion chamber 13c.

The burner 14 includes an ammonia supply pipe 31 and the starting fuel supply pipe 32. The ammonia supply pipe 31 is a pipe for supplying ammonia to the combustion chamber 13c. Ammonia flows through the space defined by the ammonia supply pipe 31. The starting fuel supply pipe 32 is a pipe for supplying the starting fuel to the combustion chamber 13c. The starting fuel flows through a space defined by the starting fuel supply pipe 32.

The ammonia supply pipe 31 and the starting fuel supply pipe 32 have a cylindrical shape. The starting fuel supply pipe 32 is disposed coaxially with the ammonia supply pipe 31 and on a radially outer side with respect to the ammonia supply pipe 31. The starting fuel supply pipe 32 covers the outer curved surface of the ammonia supply pipe 31. That is, the ammonia supply pipe 31 is inserted in the starting fuel supply pipe 32, and the starting fuel supply pipe 32 faces the outer curved surface of the ammonia supply pipe 31. However, the central axis of the starting fuel supply pipe 32 and the central axis of the ammonia supply pipe 31 may not coincide with each other. The starting fuel supply pipe 32 is disposed between the ammonia supply pipe 31 and the air flow path 23.

The ammonia supply pipe 31 and the starting fuel supply pipe 32 are inserted through the opening 13f of the liner 13b. Distal ends of the ammonia supply pipe 31 and the starting fuel supply pipe 32 are positioned, for example, in the vicinity of a step portion between the main body 13d of the liner 13b and the communication portion 13e in the axial direction. The ammonia supply pipe 31 and the starting fuel supply pipe 32 penetrate through the casing 13a and extend to the outside of the casing 13a.

Hereinafter, the radial direction of the burner 14, the axial direction of the burner 14, and the circumferential direction of the burner 14 are also simply referred to as the radial direction, the axial direction, and the circumferential direction, respectively. The combustion chamber 13c side (right side in FIG. 1) of the burner 14 is referred to as a distal end side, and the opposite side (left side in FIG. 1) of the burner 14 to the combustion chamber 13c side is referred to as a rear end side.

The ammonia tank 15 is connected to a portion of the ammonia supply pipe 31 that is outside the casing 13a. Liquid ammonia is stored in the ammonia tank 15. A first flow rate control valve 16 is provided in a flow path connecting the ammonia tank 15 and the ammonia supply pipe 31. The ammonia stored in the ammonia tank 15 is supplied to the ammonia supply pipe 31. The first flow rate control valve 16 controls (namely, adjusts) the flow rate of ammonia supplied from the ammonia tank 15 to the ammonia supply pipe 31.

An injection valve 33 is provided at the distal end of the ammonia supply pipe 31. As indicated by an arrow F2, the ammonia supplied to the ammonia supply pipe 31 flows through the internal space of the ammonia supply pipe 31.

The ammonia that has passed through the ammonia supply pipe 31 is injected (specifically, sprayed) from the injection valve 33 into the combustion chamber 13c. The injection valve 33 is, for example, a pressure injection valve (namely, a valve that atomizes liquid using a pressure difference between the inside and the outside of the injection valve) or an air flow injection valve (namely, a valve that generates a film of liquid to be injected and atomizes the liquid using a shear force between the film and air).

A starting fuel tank 17 is connected to a portion of the starting fuel supply pipe 32 that is outside the casing 13a. The starting fuel tank 17 stores starting fuel such as natural gas or hydrogen. The second flow rate control valve 18 is provided in a flow path connecting the starting fuel tank 17 and the starting fuel supply pipe 32. The starting fuel stored in the starting fuel tank 17 is supplied to the starting fuel supply pipe 32. The second flow rate control valve 18 controls (namely, adjusts) the flow rate of the starting fuel supplied from the starting fuel tank 17 to the starting fuel supply pipe 32.

As indicated by arrows F3, the starting fuel supplied to the starting fuel supply pipe 32 flows in the space between the inner curved portion of the starting fuel supply pipe 32 and the outer curved portion of the ammonia supply pipe 31. The starting fuel that has passed through the space is injected into the combustion chamber 13c from an annular opening between the distal end of the starting fuel supply pipe 32 and the distal end of the ammonia supply pipe 31. As described above, the starting fuel supply pipe 32 is separated from the ammonia supply pipe 31 in the radial direction. That is, the inner diameter of the starting fuel supply pipe 32 is larger than the outer diameter of the ammonia supply pipe 31.

Ammonia has a property of being less likely to burn than other fuels (namely, flame retardancy). Therefore, at the time of starting of the gas turbine system 1 (namely, when the combustion device 10 is started), ignition is performed using the starting fuel in the combustion chamber 13c. Specifically, ignition is performed by an ignition device (not illustrated) in a state where the starting fuel is supplied from the starting fuel supply pipe 32 to the combustion chamber 13c. That is, the starting fuel is used as fuel for ignition.

Thereafter, the supply amount of the starting fuel to the combustion chamber 13c gradually increases, and even if supply of ammonia to the combustion chamber 13c is started, the combustibility in the combustion chamber 13c is maintained at a predetermined level or more. In this state, supply of ammonia from the ammonia supply pipe 31 to the combustion chamber 13c is started. As described above, the starting fuel is also used as fuel for combustion assist (namely, fuel for assisting combustion). Note that, after the supply of ammonia to the combustion chamber 13c is started, the supply of the starting fuel to the combustion chamber 13c may be continued or stopped.

In a case where the starting fuel supply pipe 32 is not disposed between the ammonia supply pipe 31 and the air flow path 23 unlike in the present embodiment, the ammonia supply pipe 31 is exposed to high-temperature (for example, about 350° C.) air passing through the air flow path 23. Therefore, there is a risk that the ammonia supply pipe 31 is directly heated by the air passing through the air flow path 23, and vaporization of ammonia in the ammonia supply pipe 31 occurs. When ammonia is vaporized in the ammonia supply pipe 31, an injection amount of ammonia to the combustion chamber 13c becomes unstable. Further, the ammonia vaporized in the ammonia supply pipe 31 is liquefied again as the pressure in the injection valve 33 decreases. Therefore, vaporization and liquefaction of ammonia are repeated in the ammonia supply pipe 31 and the injection valve 33. Such a phenomenon also contributes to instability of the injection amount of ammonia into the combustion chamber 13c.

As described above, after ignition using the starting fuel is performed, supply of ammonia to the combustion chamber 13c is started. Therefore, in a case where the outer curved surface of the ammonia supply pipe 31 is not covered with the starting fuel supply pipe 32, the ammonia supply pipe 31 continues to be directly heated by the air passing through the air flow path 23 during a period before the supply of ammonia to the combustion chamber 13c is started.

Therefore, in particular, at the time when the supply of ammonia to the combustion chamber 13c is started, vaporization of ammonia in the ammonia supply pipe 31 is likely to occur.

As described above, in the combustion device 10 of the gas turbine system 1 according to the present embodiment, the starting fuel supply pipe 32 covers the curved surface (specifically, the outer curved surface) of the ammonia supply pipe 31 and is disposed between the ammonia supply pipe 31 and the air flow path 23. That is, in the radial direction, the flow path of the starting fuel is interposed between the flow path of ammonia and the air flow path 23. This makes it possible to prevent the ammonia supply pipe 31 from being directly heated by the air passing through the air flow path 23. The ammonia supply pipe 31 is cooled by the starting fuel passing between the starting fuel supply pipe 32 and the ammonia supply pipe 31.

During the period before supply of ammonia to the combustion chamber 13c is started, the ammonia supply pipe 31 is cooled by the starting fuel passing between the starting fuel supply pipe 32 and the ammonia supply pipe 31, and heat transfer from the air flow path 23 to the ammonia supply pipe 31 is suppressed. After the supply of ammonia to the combustion chamber 13c is started, the supply of the starting fuel to the combustion chamber 13c is stopped, or the supply amount of the starting fuel to the combustion chamber 13c is reduced, however, vaporization of ammonia is suppressed by the heat capacity of ammonia itself passing through the ammonia supply pipe 31.

As described above, according to the combustion device 10 of the gas turbine system 1 of the present embodiment, it is possible to suppress vaporization of liquid ammonia used as fuel.

Hereinafter, gas turbine systems according to individual modifications will be described with reference to FIGS. 2 to 4. Note that, in the gas turbine systems according to individual modifications described below, the configuration other than that of a burner is similar to that of the gas turbine system 1 described above, and thus description thereof is omitted.

Figure 2:
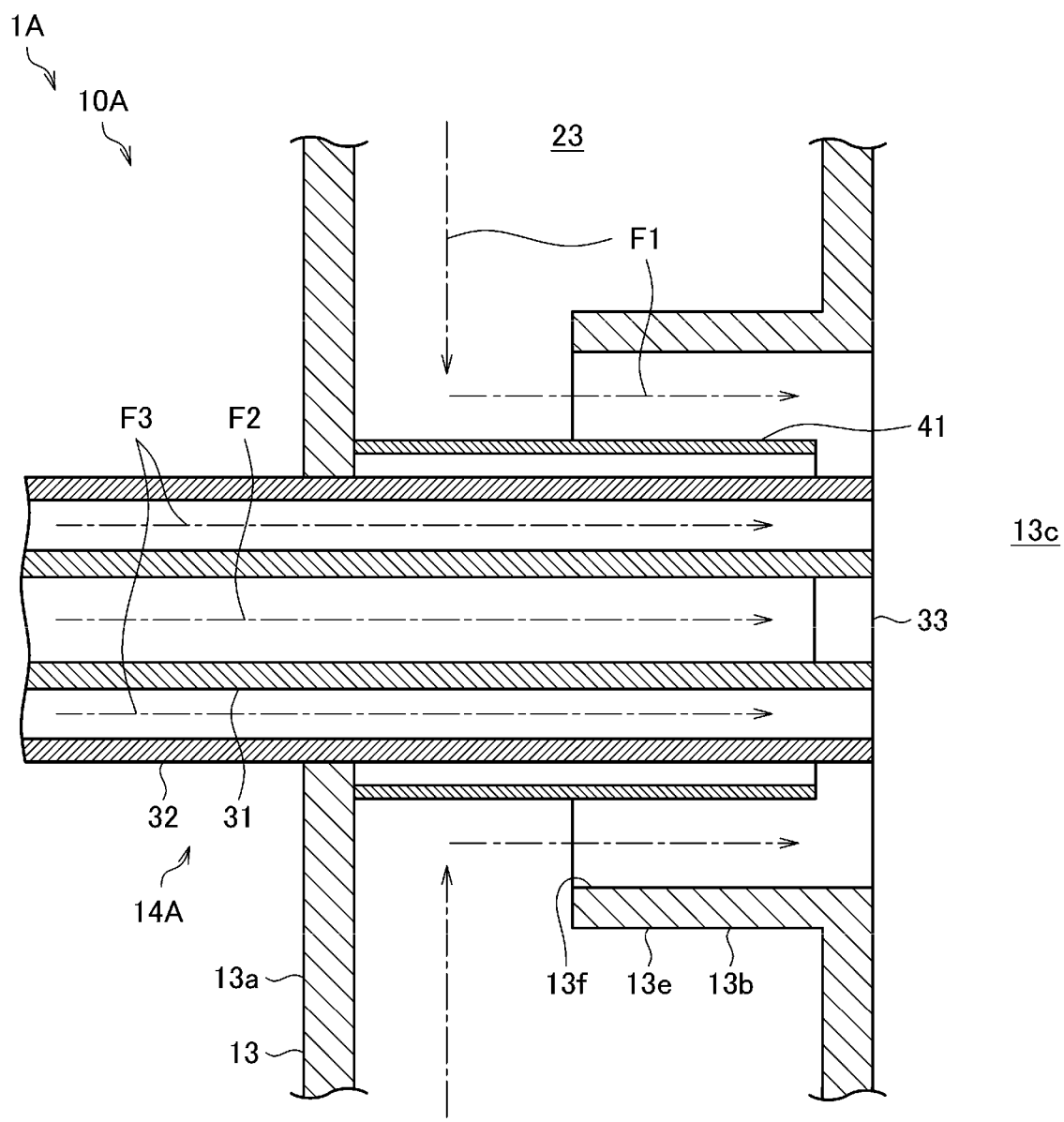
FIG. 2 is an enlarged cross-sectional view illustrating a burner according to a first modification.

FIG. 2 is an enlarged cross-sectional view illustrating a burner 14A according to a first modification. As illustrated in FIG. 2, a combustion device 10A of a gas turbine system 1A according to the first modification includes the burner 14A.

The burner 14A is different from the burner 14 described above in that a heat shielding pipe 41 is further included. The burner 14A includes an ammonia supply pipe 31, a starting fuel supply pipe 32, and the heat shielding pipe 41.

The heat shielding pipe 41 has a cylindrical shape. The heat shielding pipe 41 is disposed coaxially with the starting fuel supply pipe 32 and on a radially outer side with respect to the starting fuel supply pipe 32. The heat shielding pipe 41 covers the outer curved surface of the starting fuel supply pipe 32. That is, the starting fuel supply pipe 32 is inserted into the heat shielding pipe 41, and the heat shielding pipe 41 faces the outer curved surface of the starting fuel supply pipe 32. The heat shielding pipe 41 is separated from the starting fuel supply pipe 32 in the radial direction. That is, the inner diameter of the heat shielding pipe 41 is larger than the outer diameter of the starting fuel supply pipe 32. However, the central axis of the heat shielding pipe 41 and the central axis of the starting fuel supply pipe 32 may not coincide with each other. The heat shielding pipe 41 is disposed between the starting fuel supply pipe 32 and an air flow path 23.

The rear end of the heat shielding pipe 41 is attached to the inner surface of a casing 13a. However, the heat shielding pipe 41 may be attached to the starting fuel supply pipe 32. The heat shielding pipe 41 is inserted through an opening 13f of a liner 13b. The distal end of the heat shielding pipe 41 is positioned, for example, behind (left side in FIG. 2) the distal end of the starting fuel supply pipe 32 in the axial direction. As described above, since the heat shielding pipe 41 does not extend into the combustion chamber 13c, heat is less likely to be transferred from the combustion chamber 13c to the heat shielding pipe 41. However, the heat shielding pipe 41 may not be inserted through the opening 13f of the liner 13b. In this case, the distal end of the heat shielding pipe 41 is positioned behind the opening 13f of the liner 13b.

As described above, in the combustion device 10A of the gas turbine system 1A according to the first modification, the heat shielding pipe 41 covers the curved surface (specifically, the outer curved surface) of the starting fuel supply pipe 32 and is disposed between the starting fuel supply pipe 32 and the air flow path 23. As a result, it is possible to prevent the starting fuel supply pipe 32 from being directly heated by the air passing through the air flow path 23. Therefore, heat transfer from the air flow path 23 to the ammonia supply pipe 31 is more effectively suppressed. Therefore, vaporization of liquid ammonia used as fuel can be more effectively suppressed.

From the viewpoint of effectively suppressing heat transfer from the air flow path 23 to the ammonia supply pipe 31, the heat shielding pipe 41 is preferably formed of a material having low thermal conductivity. However, the material of the heat shielding pipe 41 is selected in consideration of various properties such as strength and heat resistance.

Figure 3:
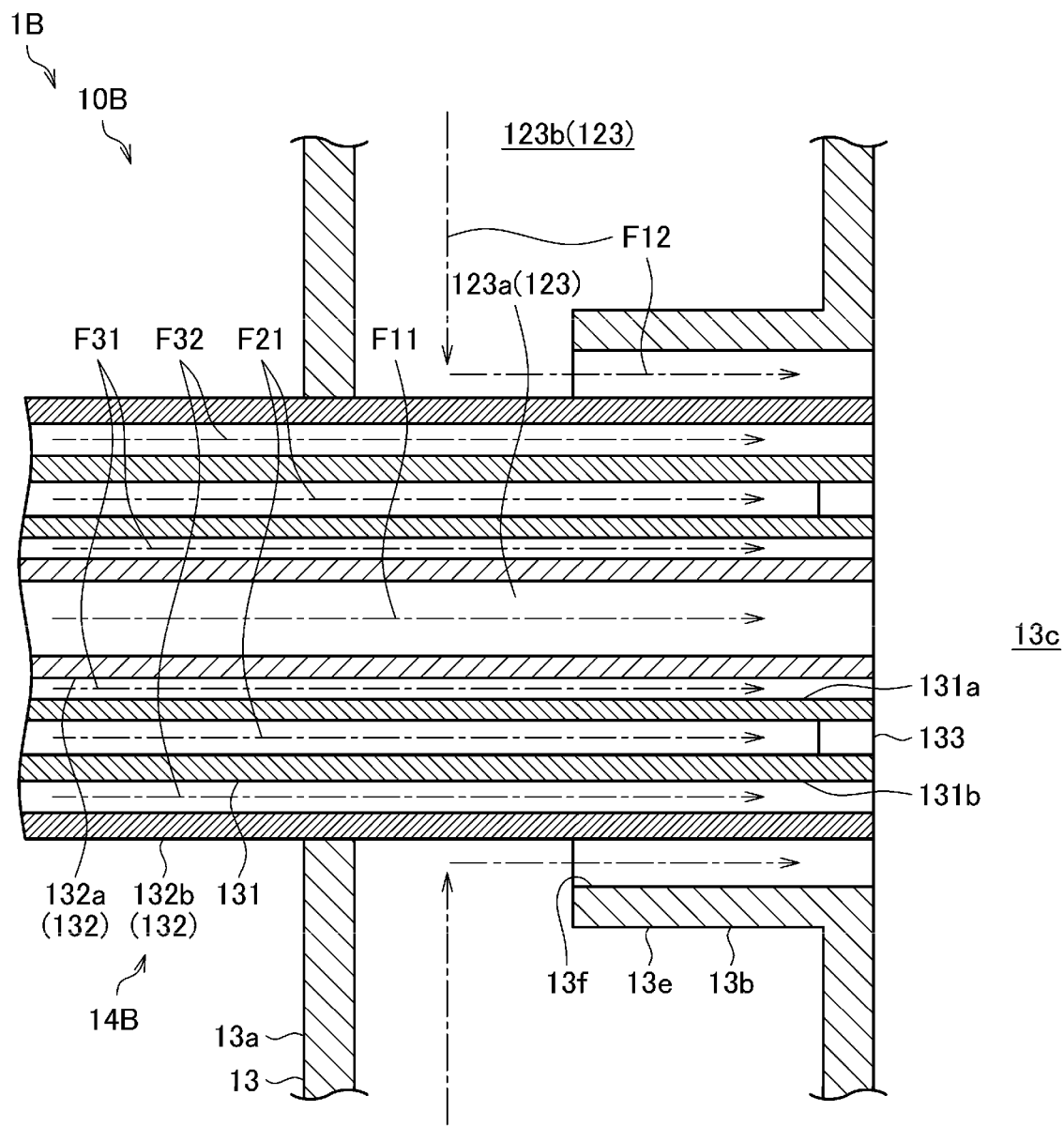
FIG. 3 is an enlarged cross-sectional view illustrating a burner according to a second modification.

FIG. 3 is an enlarged cross-sectional view illustrating a burner 14B according to a second modification. As illustrated in FIG. 3, a combustion device 10B of a gas turbine system 1B according to a second modification includes the burner 14B.

The burner 14B is different from the burner 14 described above in that an ammonia supply pipe 131 has a double cylinder structure. The burner 14B has an ammonia supply pipe 131 (specifically, an inner pipe 131a and an outer pipe 131b) and a starting fuel supply pipe 132 (specifically, a first starting fuel supply pipe 132a and a second starting fuel supply pipe 132b).

The ammonia supply pipe 131 has a double pipe structure including the inner pipe 131a and the outer pipe 131b. The inner pipe 131a and the outer pipe 131b have a cylindrical shape. The outer pipe 131b is disposed coaxially with the inner pipe 131a and on a radially outer side with respect to the inner pipe 131a. The outer pipe 131b is separated from the inner pipe 131a in the radial direction. That is, the inner diameter of the outer pipe 131b is larger than the outer diameter of the inner pipe 131a. The ammonia supply pipe 131 is supplied with ammonia from an ammonia tank 15, similarly to the above-described ammonia supply pipe 31.

An injection valve 133 is provided at the distal end of the ammonia supply pipe 131. The injection valve 133 has an annular shape. The injection valve 133 is provided in an annular opening between the distal end of the inner pipe 131a and the distal end of the outer pipe 131b. As indicated by arrows F21, the ammonia supplied to the ammonia supply pipe 131 flows in a space between the inner curved portion of the outer pipe 131b and the outer curved portion of the inner pipe 131a. The ammonia that has passed through the space is injected (specifically, sprayed) from the injection valve 133 into the combustion chamber 13c. The injection valve 133 is, for example, similar to the injection valve 33 described above.

The starting fuel supply pipe 132 includes a first starting fuel supply pipe 132a and a second starting fuel supply pipe 132b. The starting fuel is supplied from the starting fuel tank 17 to the first starting fuel supply pipe 132a and the second starting fuel supply pipe 132b, similarly to the starting fuel supply pipe 32 described above.

The first starting fuel supply pipe 132a is disposed coaxially with the ammonia supply pipe 131 on a radially inner side with respect to the inner pipe 131a of the ammonia supply pipe 131. The first starting fuel supply pipe 132a covers the inner curved surface of the inner pipe 131a. That is, the first starting fuel supply pipe 132a is inserted in the inner pipe 131a, and the first starting fuel supply pipe 132a faces the inner curved surface of the inner pipe 131a. However, the central axis of the first starting fuel supply pipe 132a and the central axis of the ammonia supply pipe 131 may not coincide with each other.

As indicated by arrows F31, the starting fuel supplied to the first starting fuel supply pipe 132a flows in the space between the outer curved portion of the first starting fuel supply pipe 132a and the inner curved portion of the inner pipe 131a. The starting fuel that has passed through the space is injected into the combustion chamber 13c from an annular opening between the distal end of the first starting fuel supply pipe 132a and the distal end of the inner pipe 131a. As described above, the first starting fuel supply pipe 132a is separated from the inner pipe 131a in the radial direction. That is, the outer diameter of the first starting fuel supply pipe 132a is smaller than the inner diameter of the inner pipe 131a.

The second starting fuel supply pipe 132b is disposed coaxially with the ammonia supply pipe 131 and on a radially outer side with respect to the outer pipe 131b of the ammonia supply pipe 131. The second starting fuel supply pipe 132b covers the outer curved surface of the outer pipe 131b. That is, the outer pipe 131b is inserted in the second starting fuel supply pipe 132b, and the second starting fuel supply pipe 132b faces the outer curved surface of the outer pipe 131b. However, the central axis of the second starting fuel supply pipe 132b and the central axis of the ammonia supply pipe 131 may not coincide with each other.

As indicated by arrows F32, the starting fuel supplied to the second starting fuel supply pipe 132b flows in the space between the inner curved portion of the second starting fuel supply pipe 132b and the outer curved portion of the outer pipe 131b. The starting fuel that has passed through the space is injected into the combustion chamber 13c from an annular opening between the distal end of the second starting fuel supply pipe 132b and the distal end of the outer pipe 131b. As described above, the second starting fuel supply pipe 132b is separated from the outer pipe 131b in the radial direction. That is, the inner diameter of the second starting fuel supply pipe 132b is larger than the outer diameter of the outer pipe 131b.

The air flow path 123 includes a first air flow path 123a and a second air flow path 123b. Similarly to the air flow path 23 described above, an intake flow path 21 is connected to each of the first air flow path 123a and the second air flow path 123b. The first air flow path 123a and the second air flow path 123b each communicate with an opening 13f of a liner 13b, similarly to the air flow path 23 described above.

The first air flow path 123a is partitioned by the inner curved surface of the first starting fuel supply pipe 132a. The first air flow path 123a extends on the central axis of the ammonia supply pipe 131. The first air flow path 123a is disposed on a radially inner side with respect to the inner pipe 131a. The inner curved surface of the inner pipe 131a is covered with the first starting fuel supply pipe 132a. That is, the first starting fuel supply pipe 132a is disposed between the inner pipe 131a and the first air flow path 123a. As indicated by an arrow F11, the air sent to the first air flow path 123a passes through the first air flow path 123a and then is injected from the distal end of the first starting fuel supply pipe 132a into the combustion chamber 13c.

Similarly to the air flow path 23 described above, the second air flow path 123b is formed between the inner surface of a casing 13a and the outer surface of the liner 13b. The second air flow path 123b is disposed on a radially outer side with respect to the outer pipe 131b. The outer curved surface of the outer pipe 131b is covered with the second starting fuel supply pipe 132b. That is, the second starting fuel supply pipe 132b is disposed between the outer pipe 131b and the second air flow path 123b. As indicated by arrows F12, the air sent to the second air flow path 123b passes through the second air flow path 123b and then is injected into the combustion chamber 13c through the opening 13f of the liner 13b. Specifically, the air sent to the second air flow path 123b passes between the inner curved surface of a communication portion 13e and the outer curved surface of the second starting fuel supply pipe 132b and is injected into the combustion chamber 13c.

As described above, in the combustion device 10B of the gas turbine system 1B according to the second modification, the first starting fuel supply pipe 132a covers the inner curved surface of the inner pipe 131a and is disposed between the inner pipe 131a and the first air flow path 123a. That is, in the radial direction, a flow path of the starting fuel is interposed between the flow path of ammonia and the first air flow path 123a. This makes it possible to prevent the inner pipe 131a from being directly heated by the air passing through the first air flow path 123a. The inner pipe 131a is also cooled by the starting fuel passing between the first starting fuel supply pipe 132a and the inner pipe 131a. The second starting fuel supply pipe 132b covers the outer curved surface of the outer pipe 131b and is disposed between the outer pipe 131b and the second air flow path 123b. That is, in the radial direction, a flow path of the starting fuel is interposed between the flow path of ammonia and the second air flow path 123b. This makes it possible to prevent the outer pipe 131b from being directly heated by the air passing through the second air flow path 123b. The outer pipe 131b is also cooled by the starting fuel passing between the second starting fuel supply pipe 132b and the outer pipe 131b.

As described above, according to the second modification, in the combustion device 10B including the ammonia supply pipe 131 having the double pipe structure, heat transfer from the air flow path 123 to the ammonia supply pipe 131 is suppressed. Therefore, vaporization of liquid ammonia used as the fuel can be suppressed.

The example in which the first starting fuel supply pipe 132a and the second starting fuel supply pipe 132b are provided as the starting fuel supply pipe 132 has been described above. However, only one of the first starting fuel supply pipe 132a and the second starting fuel supply pipe 132b may be provided as the starting fuel supply pipe 132. Also in this case, heat transfer from the air flow path 123 to the ammonia supply pipe 131 is suppressed, and thus an effect of suppressing vaporization of ammonia can be achieved. However, from the viewpoint of effectively suppressing the heat transfer from the air flow path 123 to the ammonia supply pipe 131, the first starting fuel supply pipe 132a and the second starting fuel supply pipe 132b are preferably provided as the starting fuel supply pipe 132.

Figure 4:
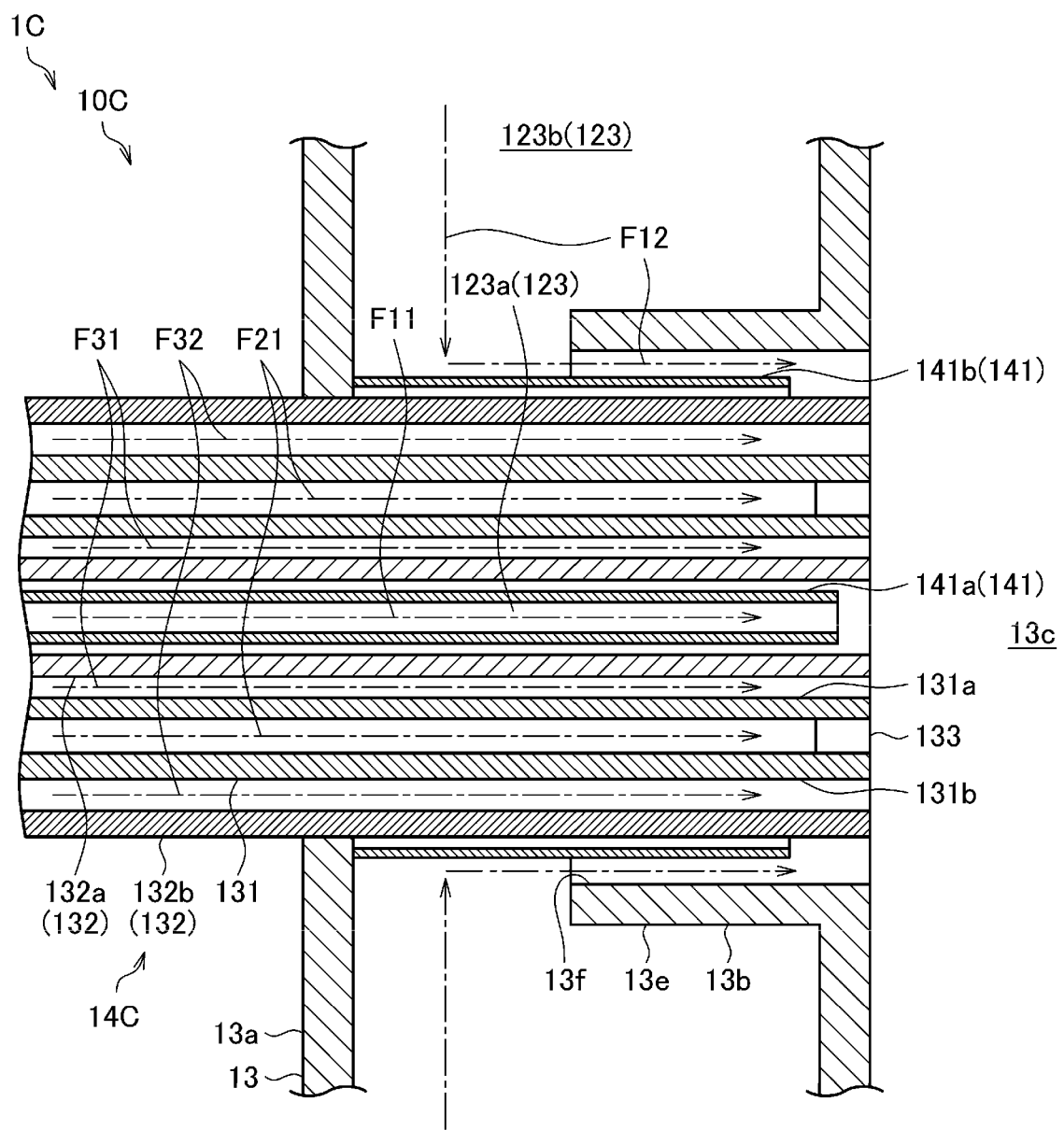
FIG. 4 is an enlarged cross-sectional view illustrating a burner according to a third modification.

FIG. 4 is an enlarged cross-sectional view illustrating a burner 14C according to a third modification. As illustrated in FIG. 4, a combustion device 10C of a gas turbine system 1C according to the third modification includes the burner 14C.

The burner 14C is different from the burner 14B described above in that a heat shielding pipe 141 is further included. The burner 14C includes an ammonia supply pipe 131 (specifically, an inner pipe 131a and an outer pipe 131b), a starting fuel supply pipe 132 (specifically, a first starting fuel supply pipe 132a and a second starting fuel supply pipe 132b), and a heat shielding pipe 141 (specifically, a first heat shielding pipe 141a and a second heat shielding pipe 141b).

The heat shielding pipe 141 includes the first heat shielding pipe 141a and the second heat shielding pipe 141b. The first heat shielding pipe 141a and the second heat shielding pipe 141b have a cylindrical shape.

The first heat shielding pipe 141a is disposed coaxially with the first starting fuel supply pipe 132a and on a radially inner side with respect to the first starting fuel supply pipe 132a. The first heat shielding pipe 141a covers the inner curved surface of the first starting fuel supply pipe 132a. That is, the first heat shielding pipe 141a is inserted in the first starting fuel supply pipe 132a, and the first heat shielding pipe 141a faces the inner curved surface of the first starting fuel supply pipe 132a. The first heat shielding pipe 141a is separated from the first starting fuel supply pipe 132a in the radial direction. That is, the outer diameter of the first heat shielding pipe 141a is smaller than the inner diameter of the first starting fuel supply pipe 132a. However, the central axis of the first heat shielding pipe 141a and the central axis of the first starting fuel supply pipe 132a may not coincide with each other. The first heat shielding pipe 141a is disposed between the first starting fuel supply pipe 132a and the first air flow path 123a. That is, in the third modification, the first air flow path 123a is partitioned by the inner curved surface of the first heat shielding pipe 141a.

The first heat shielding pipe 141a is attached to, for example, the first starting fuel supply pipe 132a. However, the first heat shielding pipe 141a may be attached to a member of the burner 14C other than the first starting fuel supply pipe 132a. The first heat shielding pipe 141a is inserted through an opening 13f of a liner 13b. The distal end of the first heat shielding pipe 141a is positioned, for example, behind (left side in FIG. 4) the distal end of the first starting fuel supply pipe 132a in the axial direction. However, the first heat shielding pipe 141a may not be inserted through the opening 13f of the liner 13b. In this case, the distal end of the first heat shielding pipe 141a is positioned behind the opening 13f of the liner 13b.

The second heat shielding pipe 141b is disposed coaxially with the second starting fuel supply pipe 132b and on a radially outer side with respect to the second starting fuel supply pipe 132b. The second heat shielding pipe 141b covers the outer curved surface of the second starting fuel supply pipe 132b. That is, the second starting fuel supply pipe 132b is inserted in the second heat shielding pipe 141b, and the second heat shielding pipe 141b faces the outer curved surface of the second starting fuel supply pipe 132b. The second heat shielding pipe 141b is separated from the second starting fuel supply pipe 132b in the radial direction. That is, the inner diameter of the second heat shielding pipe 141b is larger than the outer diameter of the second starting fuel supply pipe 132b. However, the central axis of the second heat shielding pipe 141b and the central axis of the second starting fuel supply pipe 132b may not coincide with each other. The second heat shielding pipe 141b is disposed between the second starting fuel supply pipe 132b and the second air flow path 123b.

The rear end of the second heat shielding pipe 141b is attached to the inner surface of the casing 13a. However, the second heat shielding pipe 141b may be attached to the second starting fuel supply pipe 132b. The second heat shielding pipe 141b is inserted through the opening 13f of the liner 13b. The distal end of the second heat shielding pipe 141b is positioned, for example, in the axial direction, behind (left side in FIG. 4) the distal end of the second starting fuel supply pipe 132b. However, the second heat shielding pipe 141b may not be inserted through the opening 13f of the liner 13b. In this case, the distal end of the second heat shielding pipe 141b is positioned behind the opening 13f of the liner 13b.

As described above, in the combustion device 10C of the gas turbine system 1C according to the third modification, the first heat shielding pipe 141a covers the inner curved surface of the first starting fuel supply pipe 132a and is disposed between the first starting fuel supply pipe 132a and the first air flow path 123a. This makes it possible to prevent the first starting fuel supply pipe 132a from being directly heated by the air passing through the first air flow path 123a. Therefore, heat transfer from the first air flow path 123a to the inner pipe 131a is more effectively suppressed. The second heat shielding pipe 141b covers the outer curved surface of the second starting fuel supply pipe 132b and is disposed between the second starting fuel supply pipe 132b and the second air flow path 123b. This makes it possible to prevent the second starting fuel supply pipe 132b from being directly heated by the air passing through the second air flow path 123b. Therefore, heat transfer from the second air flow path 123b to the outer pipe 131b is more effectively suppressed.

As described above, according to the third modification, in the combustion device 10C including the ammonia supply pipe 131 having the double pipe structure, vaporization of liquid ammonia used as fuel can be more effectively suppressed.

From the viewpoint of effectively suppressing heat transfer from the air flow path 123 to the ammonia supply pipe 131, it is preferable to form the heat shielding pipe 141 with a material having low thermal conductivity. However, the material of the heat shielding pipe 141 is selected in consideration of various properties such as strength and heat resistance.

The example in which the first heat shielding pipe 141a and the second heat shielding pipe 141b are provided as the heat shielding pipe 141 has been described above. However, only one of the first heat shielding pipe 141a and the second heat shielding pipe 141b may be provided as the heat shielding pipe 141. Even in this case, since the starting fuel supply pipe 132 is suppressed from being directly heated by the air passing through the air flow path 123, an effect of effectively suppressing vaporization of ammonia can be achieved. However, from the viewpoint of effectively suppressing direct heating of the starting fuel supply pipe 132 by the air passing through the air flow path 123, the first heat shielding pipe 141a and the second heat shielding pipe 141b are preferably provided as the heat shielding pipe 141.

The example in which the first starting fuel supply pipe 132a and the second starting fuel supply pipe 132b are provided as the starting fuel supply pipe 132 has been described above. However, only the first starting fuel supply pipe 132a may be provided as the starting fuel supply pipe 132, and only the first heat shielding pipe 141a may be provided as the heat shielding pipe 141. Only the second starting fuel supply pipe 132b may be provided as the starting fuel supply pipe 132, and only the second heat shielding pipe 141b may be provided as the heat shielding pipe 141.

The air passing through the air flow path 123 advances toward the combustion chamber 13c while swirling in the circumferential direction of the burner 14. Therefore, a centrifugal force acts on the air passing through the air flow path 123. Therefore, air is likely to stick to the first heat shielding pipe 141a as compared with the second heat shielding pipe 141b. Therefore, from the viewpoint of suppressing direct heating of the starting fuel supply pipe 132 by the air passing through the air flow path 123, the necessity of increasing the axial length of the first heat shielding pipe 141a is higher than the necessity of increasing the axial length of the second heat shielding pipe 141b. For example, in the example of FIG. 4, the distal end of the first heat shielding pipe 141a is closer to the combustion chamber 13c than the distal end of the second heat shielding pipe 141b is. As a result, the axial length of the first heat shielding pipe 141a can be increase as much as possible, and direct heating of the first starting fuel supply pipe 132a by the air passing through the first air flow path 123a can be effectively suppressed.

Although the embodiments of the present disclosure have been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope of the present disclosure.

In the above, the examples have been described in which the rotational power generated by the turbocharger 11 is used as energy for driving the generator 12 in the gas turbine system 1, the gas turbine system 1A, the gas turbine system 1B, and the gas turbine system 1C. However, in the gas turbine system 1, the gas turbine system 1A, the gas turbine system 1B, and the gas turbine system 1C, the rotational power generated by the turbocharger 11 may be used for other applications (for example, for the purpose of driving a mobile body such as a ship).

The examples in which the combustion device 10, the combustion device 10A, the combustion device 10B, and the combustion device 10C are used in the gas turbine system have been described above. However, the combustion device 10, the combustion device 10A, the combustion device 10B, and the combustion device 10C may be used in a device other than the gas turbine system (for example, an industrial furnace or the like in which energy recovered from exhaust heat or the like is used for combustion in a combustor).

Each of the ammonia supply pipe 31, the starting fuel supply pipe 32, the heat shielding pipe 41, the ammonia supply pipe 131, the starting fuel supply pipe 132, and the heat shielding pipe 141 has been described above by referring to the respective drawings. In each of the drawings, the wall thickness, the inner diameter, and the outer diameter of each of these pipes are constant at individual positions in the axial direction. However, the wall thickness, the inner diameter, or the outer diameter of each of these pipes may not be constant at individual positions in the axial direction. In addition, each of these pipes may not be linear. For example, each of these pipes may be bent inside or outside the casing 13a. Moreover, in the example of FIG. 1, the air flow path 23 extends between the outer curved surface of the liner 13b and the inner curved surface of the casing 13a and then sends to the combustion chamber 13c. However, the paths of the air flow paths 23 and 123 are not limited to this example (namely, reverse-flow type).

The invention claimed is:

1. A method comprising:
   passing air through an air flow path of a combustion device, wherein the air flow path communicates with an opening of a liner, the opening is at an end of the liner, the liner defines a combustion chamber, and the air flow path is a path for supplying the air to the combustion chamber;
   flowing ammonia through a space defined by and inside an ammonia supply pipe of the combustion device, wherein the ammonia supply pipe is inserted through the opening of the liner, and the ammonia supply pipe is a pipe for supplying the ammonia to the combustion chamber; and
   flowing starting fuel through a space defined by and between the ammonia supply pipe and a starting fuel supply pipe of the combustion device, wherein the starting fuel supply pipe is disposed between the ammonia supply pipe and the air flow path, wherein the starting fuel supply pipe covers a curved surface of the ammonia supply pipe, and the starting fuel supply pipe is a pipe for supplying the starting fuel to the combustion chamber,
   wherein the ammonia supply pipe is inserted in the starting fuel supply pipe.

2. A combustion device comprising:
   a liner including an opening at an end, wherein the liner defines a combustion chamber;
   an air flow path communicating with the opening of the liner, wherein air passes through the air flow path, wherein the air flow path is a path for supplying the air to the combustion chamber;
   the air that passes through the air flow path, wherein the air is within the air flow path;
   an ammonia supply pipe inserted through the opening of the liner, wherein the ammonia supply pipe defines a space through which ammonia flows inside the ammonia supply pipe, wherein the ammonia supply pipe is a pipe for supplying the ammonia to the combustion chamber;
   the ammonia that flows through the space defined by the ammonia supply pipe, wherein the ammonia is within the ammonia supply pipe;
   a starting fuel supply pipe disposed between the ammonia supply pipe and the air flow path, wherein the starting fuel supply pipe covers a curved surface of the ammonia supply pipe, wherein the starting fuel supply pipe defines a space through which starting fuel flows between the ammonia supply pipe and the starting fuel supply pipe, wherein the starting fuel supply pipe is a pipe for supplying the starting fuel to the combustion chamber; and
   the starting fuel that flows through the space defined by and between the ammonia supply pipe and the starting fuel supply pipe, wherein the starting fuel is within the starting fuel supply pipe,
   wherein the ammonia supply pipe is inserted in the starting fuel supply pipe.

3. The combustion device according to claim 2, further comprising:
   a heat shielding pipe disposed between the starting fuel supply pipe and the air flow path.

4. The combustion device according to claim 2,
   wherein the ammonia supply pipe has a double pipe structure comprising an inner pipe and an outer pipe,
   the air flow path comprises a first air flow path disposed on a radially inner side with respect to the inner pipe and a second air flow path disposed on a radially outer side with respect to the outer pipe, and
   the starting fuel supply pipe comprises a first starting fuel supply pipe disposed between the inner pipe and the first air flow path and a second starting fuel supply pipe disposed between the outer pipe and the second air flow path.

5. The combustion device according to claim 3,
   wherein the ammonia supply pipe has a double pipe structure comprising an inner pipe and an outer pipe,
   the air flow path comprises a first air flow path disposed on a radially inner side with respect to the inner pipe and a second air flow path disposed on a radially outer side with respect to the outer pipe, and
   the starting fuel supply pipe comprises a first starting fuel supply pipe disposed between the inner pipe and the first air flow path and a second starting fuel supply pipe disposed between the outer pipe and the second air flow path.

6. The combustion device according to claim 4, further comprising:
   a first heat shielding pipe disposed between the first starting fuel supply pipe and the first air flow path; and
   a second heat shielding pipe disposed between the second starting fuel supply pipe and the second air flow path.

7. The combustion device according to claim 5, wherein:
   the heat shielding pipe includes a first heat shielding pipe and a second heat shielding pipe,
   the first heat shielding pipe is disposed between the first starting fuel supply pipe and the first air flow path, and
   the second heat shielding pipe is disposed between the second starting fuel supply pipe and the second air flow path.

8. A gas turbine system comprising:
   the combustion device according to claim 2.

9. A gas turbine system comprising:
   the combustion device according to claim 3.

10. A gas turbine system comprising:
    the combustion device according to claim 4.

11. A gas turbine system comprising:
    the combustion device according to claim 5.

12. A gas turbine system comprising:
    the combustion device according to claim 4.

13. A gas turbine system comprising:
    the combustion device according to claim 7.

14. The gas turbine system according to claim 8, further comprising:

a compressor configured to send the air that passes through the air flow path, wherein the compressor is fluidly connected to the air flow path;
an ammonia tank configured to supply the ammonia to the ammonia supply pipe, wherein the ammonia tank is fluidly connected to the ammonia supply pipe; and
a starting fuel tank configured to supply the starting fuel to the starting fuel supply pipe, wherein the starting fuel tank is fluidly connected to the starting fuel supply pipe.

* * * * *